United States Patent [19]

Gimby

[11] Patent Number: 5,044,389
[45] Date of Patent: Sep. 3, 1991

[54] HIGH VOLUME FUEL VAPOR RELEASE VALVE

[75] Inventor: David R. Gimby, Livonia, Mich.

[73] Assignee: Borg-Warner Automotive, Inc., Sterling Heights, Mich.

[21] Appl. No.: 574,424

[22] Filed: Aug. 28, 1990

[51] Int. Cl.⁵ .............................................. F16K 17/36
[52] U.S. Cl. ...................................... 137/39; 137/43; 137/630.14
[58] Field of Search ................... 137/39, 43, 630.14, 137/630.15

[56] References Cited

U.S. PATENT DOCUMENTS

| | | | |
|---|---|---|---|
| 3,797,526 | 3/1974 | Champeon | 137/630.14 |
| 4,000,828 | 1/1977 | Crute | 137/43 X |
| 4,274,444 | 6/1981 | Ruyak | 137/630.14 |
| 4,679,581 | 7/1987 | Mears | 137/43 |

Primary Examiner—Robert G. Nilson
Attorney, Agent, or Firm—Emch, Schaffer, Schaub et al.

[57] ABSTRACT

The invention is a fuel vapor release valve 10 having a two-stage closure. A high volume vapor outlet 15 of large radius is sealed by a valve member 24, upon tilting of the vehicle or in the presence of liquid fuel. The valve member 24 includes a cap member 34 having an orifice 42 of small radius extending therethrough and a seat 36 for engaging with and partially sealing the vapor outlet 14. Loosely engaged with the cap member 34 is a plug member 30 carried by a float member 38 for engaging with and sealing the orifice 42. Upon return to normal operating condition, the plug member 30 first unseats from the orifice 42 and the cap member 34 then unseats from the vapor outlet 14.

4 Claims, 2 Drawing Sheets

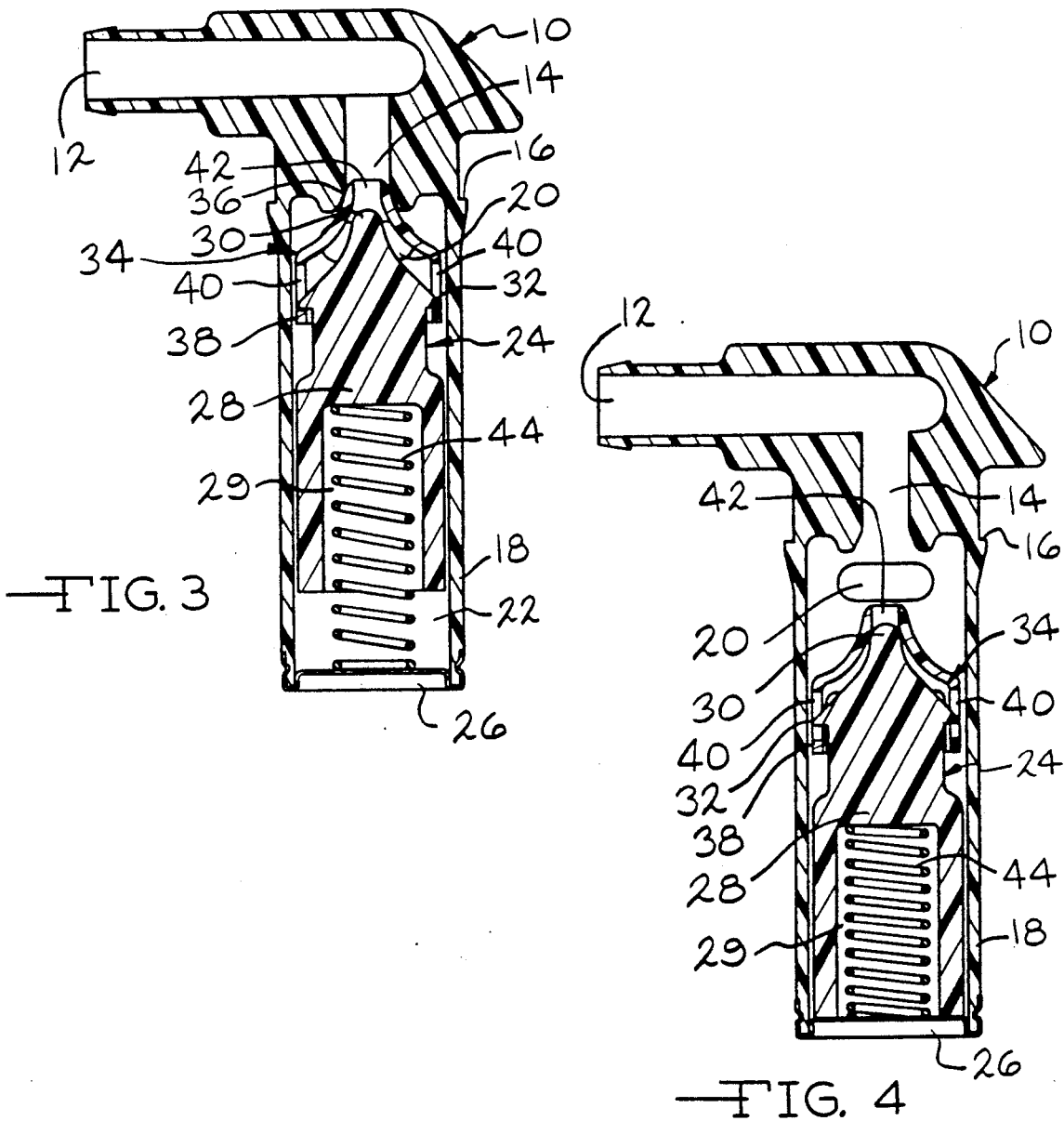

HIGH VOLUME FUEL VAPOR RELEASE VALVE

BACKGROUND OF THE INVENTION

The present invention relates to fuel system valves and in particular fuel vapor release valves for use with venting passageways and tanks in a vehicle fuel system. Specifically, the fuel vapor release valve of the present invention can be utilized as a rollover valve for the prevention of fuel spillage in the case of tilting of the vehicle beyond a specified longitudinal axis. The present invention can also be utilized as a liquid vapor discriminator valve for use in venting fuel lines and fuel filler necks and tanks.

Fuel vapor release valves are commonly incorporated as rollover valves in vehicle fuel systems for the purposes of releasing vapor pressure buildup in the fuel tank and filler necks. Vapor pressure release valves commonly will vent fuel vapors to a charcoal or carbon canister for storage until the vapors can be forwarded to the engine for combustion. The priority objective for most vapor release valves is to allow the venting of fuel vapor from a pressurized vessel while preventing any liquid fuel from escaping. Venting is most commonly conducted through an orifice to provide a controlled flow rate. Thus, vapor release valves or rollover valves must be designed to close their vapor outlets or ports during extreme tilting or rollover of the vehicle in order to prevent spillage of liquid fuel through the vapor outlet and thereby assist in preventing the potential for fires.

Vehicle fuel system tanks are allowed a maximum operative vapor pressure of fifteen kilopascals (kPa) during normal operating conditions. Rollover valves are designed to facilitate the maintenance of the vapor pressure within a vehicle fuel system at a predesired level. If the rollover valve were to close, there is a commonly encountered problem in reopening the closed rollover valve because the pressurized fuel vapor existing within the fuel system applies forces against the valve seat which must be overcome to reopen the valve. This condition is commonly called "corking". In a corking situation, the pressure in the fuel tank exerts enough force over the area of the valve orifice that the valve cannot easily reopen upon the return of the vehicle to normal operating conditions. As a result, most rollover valves are designed to have a small orifice, generally in the range of 1 to 2 millimeters in diameter. The forces applied by the fuel system vapor pressure against the small area of the outlet closure can then be easily overcome by the proper sizing and weighting of the float. However, in fuel systems where high vapor pressure occurs and where high vapor flow rates are required, a rollover valve having a small orifice is inadequate to fully relieve the vapor pressure.

Therefore, it is an object of this invention to provide a high volume fuel vapor release valve having a large diameter outlet or port capable of venting all fuel vapor generated in the tank during normal operating conditions.

A further object of the invention is to provide a fuel vapor release valve which will regularly vent all vapor generated in the fuel tank and reduce the tank pressure to a nominal or atmospheric pressure during normal operating conditions.

Yet another object of the present invention is to provide a fuel vapor release valve which will vent a high flow rate of vapor during operating conditions, close in the presence of liquid fuel and during vehicle tilting, and yet require a low force to reopen the closed valve.

SUMMARY OF THE INVENTION

The present invention achieves the objectives by providing a fuel vapor release valve having a two-stage vapor outlet closure. During normal operating conditions when the fuel vapor release valve is completely open a large vapor outlet is open to the interior of the fuel tank or filler neck and will vent a high flow of fuel vapor, thereby reducing the overall vapor pressure in the fuel system. The valve member used to close the large diameter outlet includes a two-stage member having a cap member which seats against the large diameter outlet during valve closure. The cap member has a smaller orifice which extends therethrough and opens from the outlet to the interior of the fuel tank or filler neck. A plug member fixed to a float member is engaged with the cap member and will close the small diameter orifice during valve closure. The cap member and plug member are loosely attached together so that the small orifice and the large diameter outlet can be completely sealed during vehicle tilting or any other instance when liquid fuel may enter the valve. Upon the return of the vehicle to normal operating conditions the weight of the float member will cause the plug member to first unseat from the small orifice and then the weight of the float and plug member will pull the cap away from the large diameter outlet. In this manner, the invention employs the cap member and plug member to achieve a two-stage opening wherein the forces required to reopen each stage are approximately equal to each other and each is less than the force required to open a single large orifice.

BRIEF DESCRIPTION OF THE DRAWINGS

FIG. 3 shows the fuel vapor release valve of FIG. 2 in a partially opened position with the plug member unseated from the small orifice; and, FIG. 4 shows the fuel vapor release valve of FIG. 2 with the vapor outlet completely opened.

DETAILED DESCRIPTION OF THE PREFERRED EMBODIMENTS

Figure 1:
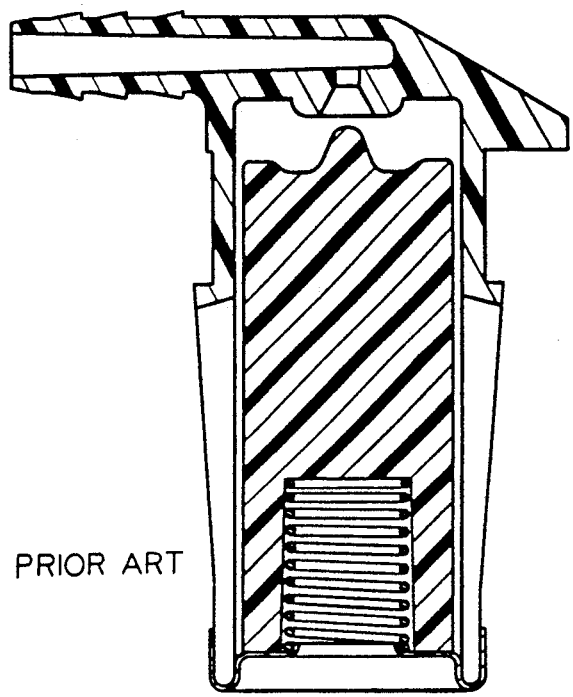
FIG. 1 shows a sectional view of a fuel vapor release valve having a single outlet commonly used in the prior art.
Figure 2:
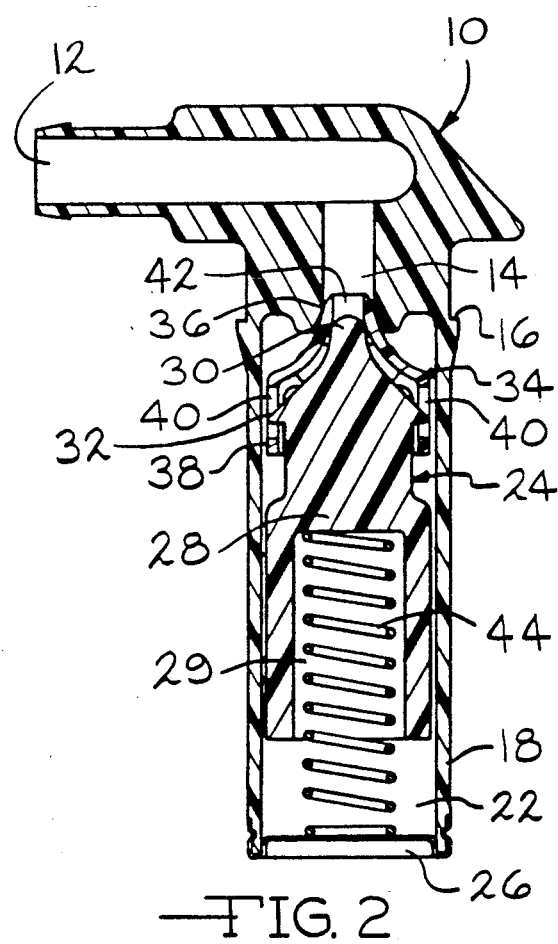
FIG. 2 shows a sectional view of the fuel vapor release valve of the present invention with the valve outlet completely closed.

The present invention provides a fuel vapor release valve having a valve body 10 which has a port 12 in communication with a vapor outlet 14 which in turn is in communication with the interior of a fuel tank (not shown). The valve body 10 is provided with a grommet retaining lip 16 about its exterior periphery for fixing the valve body 10 to the wall of the fuel tank in a leak-proof manner. The vapor outlet 14 is encompassed by a hollow valve housing 18 which extends into the interior of the fuel tank. The hollow valve housing 18 has openings or inlets 20 spaced around the periphery of the housing 18 which allow the interior cavity 22 of the hollow valve housing 18 to receive fuel vapor from the interior of the fuel tank and direct the fuel vapor through the vapor outlet 14 to the port 12 of the valve body 10 to be directed to a storage canister (not shown). In the preferred embodiment, the diameter of the vapor outlet 14 is chosen to achieve a specifically desired vapor flow when given a specified maximum attainable tank pressure. It has been found that the most desirable vapor outlet 14 diameter effectively provides the ability for the vapor release valve to achieve the objective of reducing vapor pressure within the fuel tank to a minimal level or atmospheric level by venting all fuel vapor generated in the tank to storage during normal operating conditions. Once the preferred diameter of the vapor outlet 14 is established the two-stage valve member 24 is designed to ensure that the forces required to easily reopen the vapor outlet in the presence of high fuel vapor pressures within the tank system are met.

The hollow valve housing 18 includes a base 26 which encloses and supports the two-stage valve member 24. The valve member 24 is loosely positioned in the interior cavity 22 of the valve housing 18 for movement along the longitudinal centerline of the hollow valve housing 18. The valve member 24 preferably includes a float member 28 which is topped by a plug member 30. A stepped-up or outwardly extending lip 32 is located about the peripheral circumference of the float member 28. The lip 32 is provided in at least two opposed directions on the float member 28 and is preferably located so as to provide outward projections spaced 90° apart around the peripheral circumference of the float member 28.

A cap member 34 having a seat 36 for securely sealing the cap member 34 with the vapor outlet 14 is loosely engaged with the float member 28. The cap member 34 includes a longitudinally extending flange 38 having longitudinally extending peripheral slots 40 designed to engage the outwardly projecting lips 32 of the float member 28. The cap member 34 has a small orifice 42 extending therethrough. The diameter of the orifice 42 is designed to allow the plug member 30 to firmly seat against the orifice 42 amd seal it off.

The diameter of the small orifice 42 is related to the diameter of the vapor outlet 14 to ensure that the forces required to remove the plug member 30 from the small orifice 42 are approximately equal to the forces required to remove the cap member 34 from the vapor outlet 14. The force required to reopen the orifice 42 is equal to the tank pressure multiplied by the orifice 42 area. The force required to reopen the vapor outlet 14 is equal to the area of the vapor outlet 14 minus the area of the orifice 42 multiplied by the pressure of the tank. Therefore, assuming that the gage pressure of the tank is greater than or equal to zero, the relationship of the orifice 42 size and the vapor outlet 14 size for providing the optimum minimal reopening forces for the closed valve is defined by the formula $$r = \frac{\sqrt{2}}{2} R$$

where r equals the radius of the orifice 42 and the R equals the radius of the vapor outlet 14.

Of course, under actual operating conditions, the pressure within the fuel tank will begin to be reduced as soon as the small orifice 42 is reopened. This pressure reduction will facilitate the reopening of the vapor outlet 14 and, in some applications, the assistance provided by the pressure reduction through the small orifice 42 will be significant enough to change the preferred embodiment of the orifice vapor outlet ratio to favor an even smaller orifice 42 and a larger vapor outlet 14. The preferred design ratio is intended to be applied where there is no expected decline in tank pressure after the orifice 42 is opened (i.e. instances where vapor is being rapidly generated).

In the preferred embodiment of the present invention, it is desirable to keep the effective sizes and weights of the cap 34 and float members 28 at minimal levels. Further, the float member 28 has a hollow cavity 29 located in its lower half. The cavity 29 will trap vapor or air when the valve member 24 is upright, thus contributing to the buoyancy of the float. However, when the valve member 24 is inverted, in the case of vehicle tilting, the cavity 29 will fill with liquid fuel, assisting in maintaining the valve member 24 in its closed position firmly seated against the vapor outlet 14 and the orifice 42. Thus, the size and weight of the float member 28 can be minimized, while yet achieving the desired amounts of buoyancy.

A spring member 44 is positioned in the valve cavity 22 and the float cavity 29 and is designed to provide sufficient force against the float member 28 for closing the outlet 14 and orifice 42 when the valve body 10 is tilted 90° from the vertical. In this instance, the buoyant force of the float member 28 is perpendicular to the direction of float travel and cannot serve to close the orifice 42 and vapor outlet 14 without the assistance of the spring member 44.

The preferred embodiment of the present invention operates as follows. Under normal running conditions, the float member 28 is located in its downward most orientation separating the cap member 34 from the vapor outlet 14. This enables the large diameter vapor outlet 14 to vent fuel vapor. During tilting of the automobile, and/or when liquid fuel enters the valve, the float member 28 rises in the cavity 22 of the hollow valve body 18 to engage the plug member 30 with the orifice 42 and engage the cap member 34 with the vapor outlet 14 thereby sealing the vapor release valve. This prevents any release of vapor or liquid fuel into the port 12. Upon return to normal operating conditions, the float member 28 will drop to its original position thereby unseating the plug member 30 from the small orifice 42. As the float member 28 drops the outwardly projecting lips 32 engage the lower portion of the slots 40 of the cap member 34 and pull the cap member 34 away from the vapor outlet 14 thereby reopening the vapor outlet 14 to the pressure and fuel vapors within the tank.

The above description of the preferred embodiment of the present invention is intended to be illustrative in purpose. It is not intended to be limiting in nature upon the scope and content of the following claims.

I claim:

1. A fuel vapor release valve for use in a vehicle fuel system comprising, in combination:

a valve housing 10 placed in a specific longitudinal orientation, said valve housing 10 defining an interior cavity 22 having an inlet 20 for admitting fuel vapor and an outlet 14 for discharging such fuel vapor;

a valve member 24 positioned in said cavity 22 for movement between an outlet 14 opening position and an outlet 14 closing position, said valve member 24 including a cap member 34 having a seat surface 36 for mating with said outlet 14 and an orifice 42 extending through said cap member 34 providing a passageway from said outlet 14 to said cavity 22, said orifice 42 having a lesser radius than said outlet 14;

said valve member 24 further including a plug member 30 engaged with said cap member 34 for movement between an orifice 42 opening position and an orifice 42 closing position; and, a valve housing tilt responsive means for moving said valve member 24 to an outlet 14 and orifice 42 closing position in response to tilting of said valve 10 about its longitudinal axis whereby, upon the return of said valve 10 to its specified longitudinal orientation, said plug member 30 first moves to an orifice 42 opening position and said cap member 34 subsequently moves to an outlet 14 opening position.

2. The valve 10 of claim 1, wherein the radius r of said orifice 42 is defined in relationship to the radius R of said outlet 14 by the formula $$r = \frac{\sqrt{2}}{2} R.$$

3. The valve of claim 2, wherein said tilt responsive means includes a float member 28 integrally formed with said plug member 30, said float member 28 being buoyant when exposed to fuel.

4. The valve of claim 3, wherein said float member 28 is engaged with a resilient member 44 within said interior cavity 22 wherein said resilient member provides additional lifting forces to said float member 28.

* * * * *